C. B. GIPSON.
ICE SAWING MACHINE.
APPLICATION FILED AUG. 3, 1916.
1,245,899.
Patented Nov. 6, 1917.
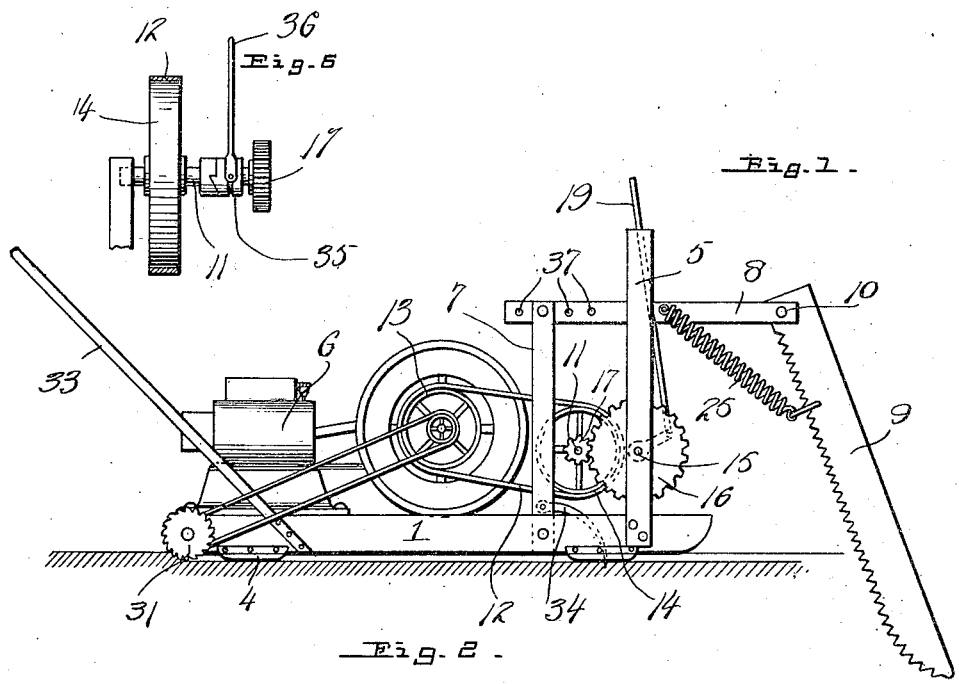
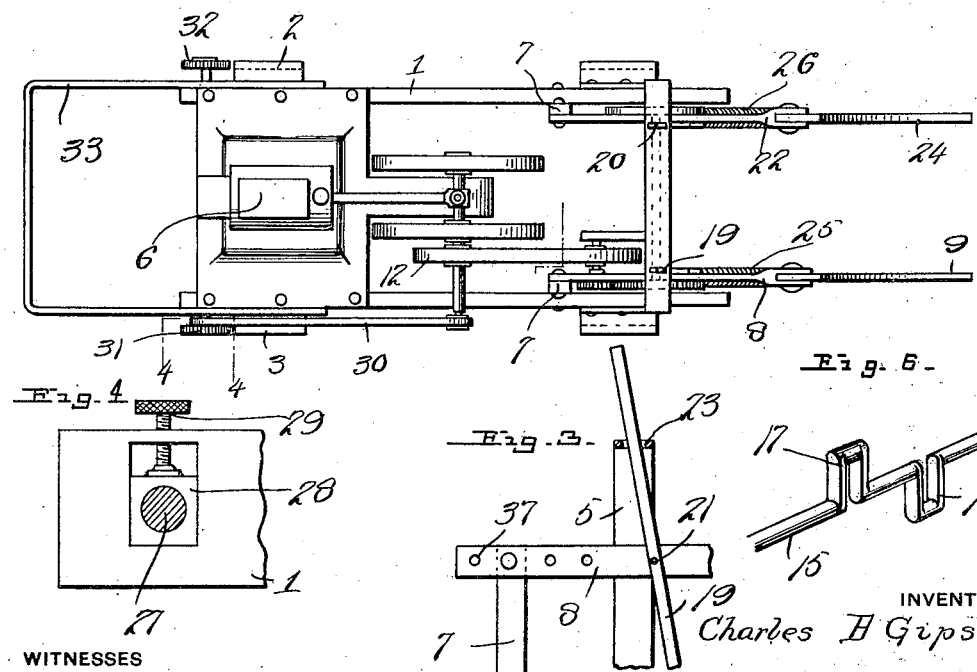
WITNESSES
Chas. E. Kemper
Lloyd W. Patch
INVENTOR
Charles B Gipson.
BY Richard B Oliver
ATTORNEY

UNITED STATES PATENT OFFICE.

CHARLES B. GIPSON, OF FRANKFORT, SOUTH DAKOTA.

ICE-SAWING MACHINE.

1,245,899.  Specification of Letters Patent.  Patented Nov. 6, 1917.

Application filed August 3, 1916. Serial No. 113,000.

*To all whom it may concern:*

Be it known that I, CHARLES B. GIPSON, a citizen of the United States, residing at Frankfort, in the county of Spink and State of South Dakota, have invented certain new and useful Improvements in Ice-Sawing Machines, of which the following is a specification.

This invention relates to an improvement in ice sawing machines and more particularly to such machines as are adapted for use upon an ice field for cutting the ice in such a way that it may be divided up into cakes or blocks which can be more readily handled and packed.

An object of my invention resides in providing a machine of the nature set forth which will follow a guiding kerf cut across the ice field or will operate to cut a kerf and which will be automatically moved forward to travel over the field as the saws cut into the ice.

A further object is to provide saw actuating means which is so arranged that adjustment may be made to vary the strokes of the saw, and with which the main cutting saw as well as the kerf marker may be moved to inoperative relations when the machine is being transported or moved from one location to another.

A still further object lies in providing a gang of saws, namely two or more saws, which will be operated in successive rotation so that the load upon the power plant will be at all times maintained substantially constant, and to provide coöperating means acting with the saws to cut a guiding kerf therefor.

With the above and other objects in view, my invention consists in certain novel features of construction and combinations of parts which will be hereinafter set forth in connection with the drawings and then more particularly pointed out in the claims.

In the drawings:

Figure 1 is a view in side elevation of a machine constructed after the manner of my invention.

Fig. 2 is a top plan view of the structure.

Fig. 3 is a fragmentary detail view to better show parts of the operating mechanism.

Fig. 4 is a fragmentary view showing the means for adjusting the kerfing saws.

Fig. 5 is a detail view illustrating a clutch which may be formed as a part of the structure.

Fig. 6 is a fragmentary perspective view showing a form of crank shaft which might be used with the machine.

The supporting base structure 1 has the runners 2 and 3 connected on the opposite sides thereof and brought down to terminate in comparatively narrow blades 4 which will be of such thickness that when traveling over the ice they will hold the machine against side slipping or skidding and at the same time are made of such form that they may be received in prior kerfs formed over the surface of the field to guide the course of travel of the machine during the sawing operation. The supporting standards 5 are mounted at opposite sides of the machine adjacent to one end thereof, and adjacent to the opposite end of the supporting base structure or frame, an internal combustion engine 6, or other suitable power plant is mounted. It is perhaps desirable that an internal combustion engine be used as the power unit for this machine, for the reason that such a power unit can be economically operated and fuel for the same can be obtained in practically any location.

A rocking arm 7 is mounted pivotally at its lower end on each side of the supporting base structure 1 and at its upper end connected with a walking beam member 8 to be capable of pivotal swinging movement, ice saws 9 being pivotally connected as at 10 with the free end of these walking beam members 8.

A power transmission shaft 11 is mounted in suitable bearings provided adjacent to the upright supporting standards 5, and a belt 12 is led over a belt pulley 13 on the engine shaft and over a pulley 14 on the power transmission shaft 11 so that when the engine is operated this shaft will be turned at substantially the same speed therewith. An operating shaft 15 is mounted between the upright supporting standards 5 to extend transversely across the machine and a gear wheel 16 thereon is in mesh with a pinion 17 on the power transmission shaft 11, rotary movement being thus transmitted to the operating shaft 15.

The shaft 15 has the oppositely disposed crank arms 17 and 18, as is better shown in Fig. 6, and pitman rods 19 and 20 are connected from the wrist pin carried by these crank arms and have pivotal connection as at 21 with the walking beams 8 and 22. The pitman rods 19 and 20 are extended past the pivotal connection at 21 with the walking beams and the free upper ends are passed through slide bearings 23 carried by the upright supporting standards 5, and thus as the operating shaft 15 is rotated and movement is imparted to the pitman rods 19 and 20, the walking beams 8 and 22 will be given up and down swinging movement on the four carrying ends around the pivotal mounting with the rocking arms 7, and at the same time due to the fact that the pitman rods 19 and 20 are held by the slide bearings 23, the walking beams 8 and 22 will be given swinging movement forwardly and backwardly with the pivotal mounting of the rocking levers 7 on the base structure 1 as the swinging center.

The ice saws 9 and 24 are connected with the outer ends of the walking beams 8 and 22, and as has been hereinbefore stated the saws are pivotally mounted on the walking beams so that they will be capable of swinging movement. Coil springs 25 and 26 are connected between the toothed edges of the saws 9 and 24 and the walking beams 8 and 22 respectively, and thus the saws are resiliently drawn or swung toward the supporting base structure. As the engine is operated and turning movement is transmitted to the operating shaft 15, the arrangement of the parts as hereinbefore set forth will cause the walking beams 8 and 22 to be given a forward and back swinging movement and at the same time to be rocked at their outer ends in a substantially vertical path, and due to the fact that the saws 9 and 24 depend from these walking beams 8 and 22 and are held drawn inwardly by the coil springs 25 and 26, as the saws are reciprocated and given the swinging movement, they will perform a very efficient cutting path of movement.

A shaft 27 is mounted across the forward part of the machine to be placed low down on the base structure 1, and this shaft is held in the adjustable bearings 28, the height of which may be regulated through the swiveled adjusting screws 29. A belt 30 is connected from the engine shaft to this shaft 27, and thus as the engine is operated turning movement is transmitted to the shaft 27. Kerfing saws are so arranged that the blade edges 4 of the shoes or runners 2 and 3 are in line therewith. As the bearings 28 are adjusted sufficiently low down that the kerfing saws 31 and 32 extend below the base frame structure 1, and the machine is moved forwardly while the engine is in operation, these kerfing saws 31 and 32 will cut into the ice and will form a straight draw mark or kerf in which the runners 2 and 3 may slide to guide the course of travel of the machine and to insure that straight cuts are made into the ice. It is not the intention that the kerfing saws 31 and 32 shall exert any action to propel the machine, and for that matter the action of the saws 9 and 24 would normally tend to move the machine as an entirety backwardly, however, a handle 33 may be provided on the forward end of the machine and by the use of this handle the entire structure may be slid bodily over the ice field and may be moved to any desired location. While the handle 33 may be used for the initial placing of the machine and perhaps under some circumstances for insuring that the machine is given forward propulsion, it is desirable that some means be provided whereby the machine will be constantly and automatically moved forwardly during the normal cutting operation and will be carried at such a rate of speed that the saws will cut into the ice as rapidly as the machine is moved. To accomplish this forward travel of the machine, I provide the long curved dogs 34 which are provided with sharp ends and are pivotally mounted on the rocking arms or levers 7, as is better shown in Fig. 1. As the rocking arms or levers 7 are given forward and back swinging movement around their pivotal mounting on the base structure 1, these spurs 34 will be drawn forwardly and will then be carried rearwardly, and due to the fact that the spur ends thereof are embedded in the ice by this backward movement, the machine will be slid or moved forward slightly with each back swinging stroke of rocking arms or levers 7. As has been set forth above, it is preferable that the crank arms 17 and 18 by which the walking beams 8 and 22 are actuated be oppositely disposed, and in this way the strain upon the engine in the sawing operation is more evenly distributed and at the same time the machine will be given substantially continuous forward propulsion.

When the machine is to be moved from one locality to another or is to be brought to a new location on the ice field, the saws 9 and 24 may be swung around their pivotal mounting at 10 on the walking beams 8 and 22 and the springs 25 and 26 will then hold these saws in the raised and swung back position with the teeth disposed upwardly, and also by manipulation of the adjusting screws 29, the shaft 27 can be raised sufficiently that the kerfing saws 31 and 32 are in the inoperative relation. Under some circumstances it may be found desirable to clear out the parts transmitting movement to the operating shaft 15, and in Fig. 5 I have illustrated a clutch which might be embodied with the transmission from the shaft 11. As here shown, the pinion 17 is loose on the shaft 11 and a clutch member 35 is arranged to connect the pinion to rotate with the shaft, a clutch actuating lever 36 being provided to shift this clutch member 35 when desired.

In the use of the device, the shaft 27 will be adjusted downwardly sufficiently that the kerfing saws 31 and 32 will cut into the ice, or the machine might be initially started or perhaps even operated continuously in kerf marks made across the ice field by the use of a horse drawn or other kerfing saw or marker. The engine 6 is started and the ice saws 9 and 24 are swung down to the operative relation as are also the curved dogs 34. As motion is transmitted to the operating shaft 15, the saws 9 and 24 will be actuated and the dogs 34 will be swung or moved backwardly and forwardly to cause forward propulsion of the machine so that the saws will at all times be cutting into the ice. Where the kerfing saws 31 and 32 are used, these saws will cut a kerf or mark in advance of the runners 2 and 3 and as the blades 4 of these runners are fitted in the kerf marks, the machine will be guided so that the sawing will be in a straight path.

While I have herein shown and described only one specific form of the device, it will be understood that changes and modifications might be resorted to in the form and arrangement of the various parts without departing from the spirit and scope of my invention, and hence I do not wish to be limited to the exact disclosure but only to such points as may be set forth in the claims.

I claim:

1. An ice saw comprising a supporting base structure, a frame structure mounted on the base structure, a power unit carried by the base structure, a rocking arm pivotally mounted at one end of the base structure, a walking beam mounted on the free end of said rocking arm, a crank operating shaft, a pitman from the crank operating shaft to the walking beam held in a slide bearing at its outer end, a saw connected with the free end of the walking beam, and a power transmitting connection from the power unit to the operating shaft.

2. An ice saw comprising a supporting structure to be moved over an ice field, a rocking arm pivotally mounted low down on the base structure, a walking beam adjustably connected with the free end of said operating arm, a crank operating shaft, a slide bearing provided on the upper part of the supporting structure, a pitman connected from the crank operating shaft and extending through said slide bearing, a connection from the pitman to the walking beam, a saw connected with the free end of the walking beam, and means to turn the operating shaft.

3. An ice saw comprising a supporting structure to be moved over an ice field, a rocking arm pivotally mounted low down on the base structure, a walking beam adjustably connected with the free end of said operating arm, a crank operating shaft, a slide bearing provided on the upper part of the supporting structure, a pitman connected from the crank operating shaft and extending through said slide bearing, a connection from the pitman to the walking beam, a saw connected with the free end of the walking beam, means to turn the operating shaft, and means connected with the rocking arm to engage with the ice and cause step by step advancing movement of the supporting structure as the rocking arm is swung through turning of the operating shaft.

4. An ice saw comprising a supporting structure to be moved over an ice field, a rocking arm pivotally mounted low down on the base structure, a walking beam adjustably connected with the free end of said operating arm, a crank operating shaft, a slide bearing provided on the upper part of the supporting structure, a pitman connected from the crank operating shaft and extending through said slide bearing, a connection from the pitman to the walking beam, a saw connected with the free end of the walking beam, means to turn the operating shaft, and means associated with the rocking arm to hold the supporting structure on the operative stroke of the saw and to impart step by step advancing movement to the supporting structure upon the upward strokes of the saw.

5. An ice cutting machine comprising a supporting base structure, an upright frame structure mounted adjacent one end of the supporting base structure, a power unit mounted on the base structure adjacent the opposite end, a pair of rocking arms pivotally mounted on the base structure adjacent the upright frame structure, walking beams adjustably connected with said swinging arms at their free ends, saws mounted on the outer ends of the walking beams, a crank operating shaft having the cranks thereof extended in opposite directions, pitman rods connected from said cranks to the walking beams, slide bearings by which the upper ends of the pitman rods are held to have movement in a fixed relation and to cause rocking movement of the rocking arms, and a power connection from the power unit to the operating shaft to cause turning thereof during operation of the engine.

6. An ice cutting machine comprising a supporting base structure, an upright frame structure mounted adjacent one end of the supporting base structure, a power unit mounted on the base structure adjacent the opposite end, a pair of rocking arms pivotally mounted on the base structure adjacent the upright frame structure, walking beams adjustably connected with said swinging arms at their free ends, saws mounted on the outer ends of the walking beams, a crank operating shaft having the cranks thereof extended in opposite directions, pitman rods connected from said cranks to the walking beams, slide bearings by which the upper ends of the pitman rods are held to have movement in a fixed relation and to cause rocking movement of the rocking arms, a power connection from the power unit to the operating shaft to cause turning thereof during operation of the engine, and dogs carried by said rocking arms above the pivotal mounting thereof on the base structure to engage with the ice as these arms are rocked and to consequently cause forward propulsion of the machine.

In testimony whereof I affix my signature in presence of two witnesses.

CHARLES B. GIPSON.

Witnesses:
A. W. REFUEM,
F. M. KUHNS.

Copies of this patent may be obtained for five cents each, by addressing the "Commissioner of Patents, Washington, D. C."